United States Patent
Moake

(10) Patent No.: US 8,321,132 B2
(45) Date of Patent: Nov. 27, 2012

(54) COMBINING LWD MEASUREMENTS FROM DIFFERENT AZIMUTHS

(75) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 459 days.

(21) Appl. No.: 12/522,783

(22) PCT Filed: Apr. 10, 2007

(86) PCT No.: PCT/US2007/008958
§ 371 (c)(1),
(2), (4) Date: Dec. 1, 2009

(87) PCT Pub. No.: WO2008/123853
PCT Pub. Date: Oct. 16, 2008

(65) Prior Publication Data
US 2010/0145621 A1    Jun. 10, 2010

(51) Int. Cl.
*G01V 11/00* (2006.01)
*G06F 19/00* (2011.01)
*G06F 17/40* (2006.01)

(52) U.S. Cl. . 702/11; 73/152.02; 73/865.8; 166/250.01; 175/50; 702/8; 702/187; 702/189; 708/200

(58) Field of Classification Search ............... 73/152.01, 73/152.02, 152.05, 152.43, 152.46, 432.1, 73/865.8, 866, 152.03; 166/244.1, 250.01; 250/253; 324/232; 367/86; 702/1, 2, 6, 702/7, 8, 11, 127, 179, 180, 187, 189; 175/40, 175/41, 50
See application file for complete search history.

(56) References Cited

U.S. PATENT DOCUMENTS

| | | | | |
|---|---|---|---|---|
| 3,230,445 A | * | 1/1966 | Sloughter et al. | 324/339 |
| 4,492,865 A | | 1/1985 | Murphy et al. | |
| 5,091,644 A | | 2/1992 | Minette | |
| 5,451,779 A | | 9/1995 | Spross et al. | |
| 5,473,158 A | * | 12/1995 | Holenka et al. | 250/254 |
| 5,486,695 A | * | 1/1996 | Schultz et al. | 250/261 |
| 5,513,528 A | * | 5/1996 | Holenka et al. | 73/152.03 |
| 5,726,951 A | * | 3/1998 | Birchak et al. | 367/38 |
| 5,899,958 A | * | 5/1999 | Dowell et al. | 702/6 |
| 6,044,326 A | * | 3/2000 | Huiszoon | 702/8 |

(Continued)

FOREIGN PATENT DOCUMENTS
WO    WO-03/048814 A1    6/2003
(Continued)

OTHER PUBLICATIONS

"International Application Serial No. PCT/US2007/008958, International Preliminary Report on Patentability mailed Oct. 22, 2009", 8 pgs.

(Continued)

*Primary Examiner* — Edward Cosimano
(74) *Attorney, Agent, or Firm* — Schwegman Lundberg & Woessner, P.A.

(57) ABSTRACT

Apparatus, methods for forming the apparatus, and methods for operating the apparatus provide a value for a formation property or a borehole property from measurements obtained in a well. The value may be generated from determining a weighted average of the value for the formation property or the borehole property using both values corresponding to different azimuths and weights corresponding to different azimuths.

34 Claims, 3 Drawing Sheets

U.S. PATENT DOCUMENTS

| | | | |
|---|---|---|---|
| 6,307,199 B1* | 10/2001 | Edwards et al. | 250/269.3 |
| 6,566,649 B1* | 5/2003 | Mickael | 250/269.3 |
| 6,584,837 B2* | 7/2003 | Kurkoski | 73/152.02 |
| 6,590,202 B2* | 7/2003 | Mickael | 250/269.2 |
| 6,619,395 B2* | 9/2003 | Spross | 166/254.2 |
| 6,666,285 B2 | 12/2003 | Jones et al. | |
| 6,700,115 B2* | 3/2004 | Mickael | 250/269.3 |
| 6,768,106 B2* | 7/2004 | Gzara et al. | 250/269.3 |
| 6,894,274 B2* | 5/2005 | Valant-Spaight | 250/269.4 |
| 6,942,043 B2 | 9/2005 | Kurkoski | |
| 6,957,145 B2* | 10/2005 | Spross | 702/8 |
| 7,129,477 B2* | 10/2006 | Schneider et al. | 250/266 |
| 7,432,500 B2* | 10/2008 | Sale | 250/269.3 |
| 2002/0008197 A1* | 1/2002 | Mickael | 250/269.2 |
| 2002/0190198 A1* | 12/2002 | Mickael | 250/269.3 |
| 2003/0057366 A1* | 3/2003 | Gzara et al. | 250/269.3 |
| 2003/0062158 A1 | 4/2003 | Spross | |
| 2003/0101806 A1* | 6/2003 | Kurkoski | 73/152.02 |
| 2003/0122067 A1 | 7/2003 | Radtke et al. | |
| 2004/0021066 A1* | 2/2004 | Schneider et al. | 250/266 |
| 2004/0113061 A1* | 6/2004 | Valant-Spaight | 250/269.4 |
| 2005/0075853 A1* | 4/2005 | Spross | 703/10 |
| 2005/0189483 A1* | 9/2005 | Sale | 250/269.3 |

FOREIGN PATENT DOCUMENTS

| | | |
|---|---|---|
| WO | WO-2005083469 A1 | 9/2005 |
| WO | WO-2008/123853 | 10/2008 |

OTHER PUBLICATIONS

"International Application Serial No. PCT/US2007/008958, International Search Report mailed Feb. 21, 2008", 4 pgs.

"International Application Serial No. PCT/US2007/008958, Written Opinion mailed Feb. 21, 2008", 8 pgs.

Evans, M., et al., "Improved Formation Evaluation Using Azimuthal Porosity data while Drilling", (SPE Paper 30546), *SPE Annual Technical Conference and Exhibition*, (Oct. 22-25, 1995), (1995), 1-10.

\* cited by examiner

COMBINING LWD MEASUREMENTS FROM DIFFERENT AZIMUTHS

RELATED APPLICATION

This application is a nationalization under 35 U.S.C. 371 of PCT/US2007/008958, filed Apr. 10, 2007 and published as WO 2008/123853 A1, on Oct. 16, 2008; which application and publication are incorporated herein by reference and made a part hereof.

TECHNICAL FIELD

The present invention relates to systems for making measurements in a well.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Further, the usefulness of such measurements may be related to the precision or quality of the information derived from such measurements. Thus, what are needed are methods of making measurements in a well and measurement apparatus that provide for efficient operation with appropriate accuracy.

BRIEF DESCRIPTION OF THE DRAWINGS

Embodiments of the invention are illustrated by way of example and not limitation in the figures of the accompanying drawings.

DETAILED DESCRIPTION

The following detailed description refers to the accompanying drawings that show, by way of illustration, various embodiments of the present invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
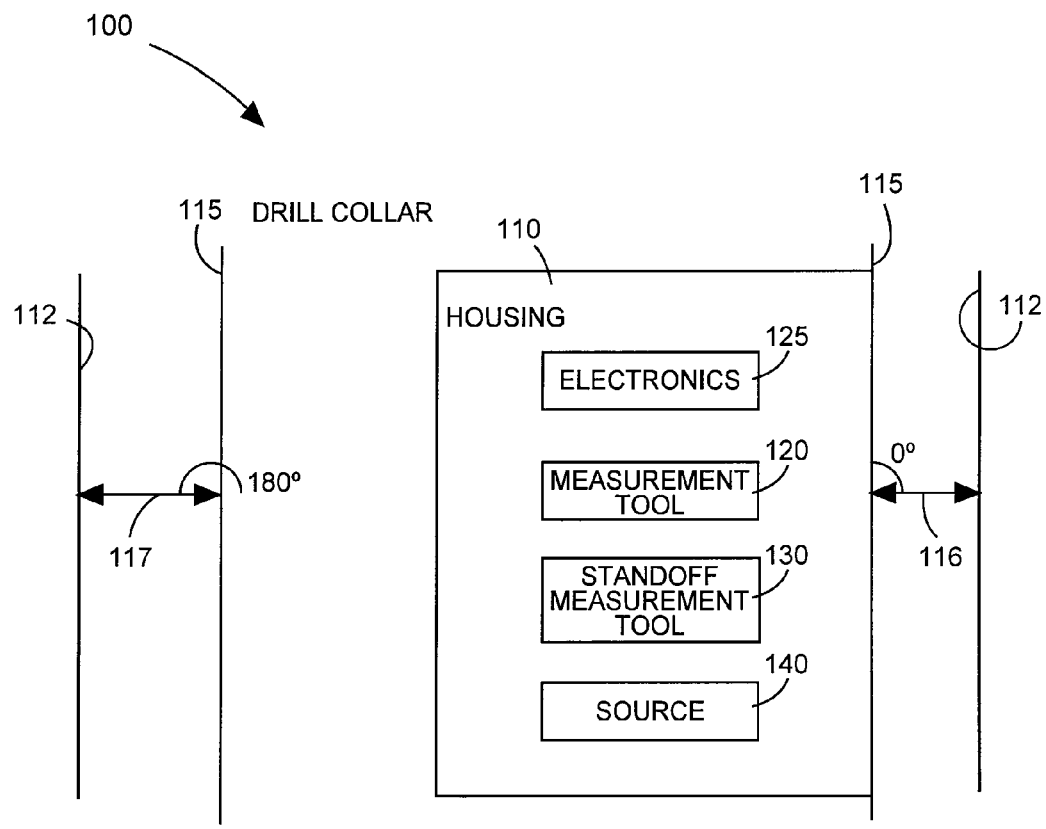
FIG. 1 shows an embodiment of a system for making measurements in a well while drilling.

FIG. 1 shows an embodiment of a system 100 for making measurements in a well while drilling. Such measurements may include formation and borehole measurements. System 100 may include a measurement tool 120 and electronics 125. System 100 may include a standoff measurement tool 130. Measurement tool 120 may be configured to make measurements while drilling, where the measurements are correlated to a formation property or a borehole property around a borehole. Measurement tool 120 may include one or more sensors to make measurements. Electronics 125 may be operatively coupled to measurement tool 120 to acquire the measurements. Electronics 125 may include a set of processors and a set of memories such that stored software in electronics 125 may be used to process various algorithms to generate and store formation or borehole properties. Such storage may be realized in another module on a drill collar 115 on which electronics 125 are arranged or a module on another collar. Such storage may be realized in another housing on the drill string. A mud communication system or other system may used to transfer the information.

Electronics 125 may be configured to determine a value of the formation property or the borehole property for each azimuthal bin of a plurality of azimuthal bins, where each azimuthal bin corresponds to a different angular range relative to the measurement tool, and to compute a weighted average of the formation property or the borehole property using the determined value for each azimuthal bin and a weight associated with each azimuthal bin. In an embodiment, a weighted average of count rates determined by measurement tool 120 is converted to generate a single value for a borehole property or a formation property.

Measurement tool 120 and electronics 125 may be disposed on a housing 110 arranged for placement with drilling collar 115. In an embodiment, housing 110 may include a measurement source 140. Multiple housings may be attached at various locations along a string of drill pipes. Such a string of drill pipes may be referred to as a drill string. Each housing may contain measurement tools having one or more sensors. Each sensor may be designed to be sensitive to a form of radiation that passes through the borehole or formation. If the type of measurement employed uses a source of radiation generated from the measurement apparatus, such a source may be located in its associated housing. Measurements may include sensing radiation or other form of emission that is naturally provided from the formation, where the emission is a function of the composition and structure of the formation.

Measurement tool 120 may be arranged on drill collar 115 such that it is not centered with respect to the borehole walls 112 of the well in which it is being used. As a result, the measurement tool 120 may be considered to have a front side and a back side. In FIG. 1, the front side of measurement tool 120 corresponds to the angle of 0° and the back side of measurement tool 120 corresponds to the angle of 180°. Standoff is the radial distance from the front of measurement tool 120 to borehole wall 112. The standoff may be determined as the radial distance from the borehole wall 112 to the surface of drill collar 115 with the orientation of measurement tool 120 relative to the surface of drill collar 115 taken into account when processing the measurements taken by measurement tool 120. As shown in FIG. 1, the standoff corresponding to the angle of 0° is correlated to distance 116 and the standoff corresponding to the angle of 180° is correlated to distance 117. As drilling collar 115 rotates, the standoff at each azimuthal angle may vary. The angles may be referenced to a location on a side of the borehole. Azimuth may be determined by magnetometers, which continually measure the tool's angle relative to the earth's magnetic field. Periodically, (when the tool is not drilling) the tool's orientation in the borehole may be measured relative to the gravitational field using accelerometers. This is used to calibrate the offset between north and the high side of the borehole. Thus, the bins may be defined relative to the high side of the borehole. Structuring the bins is not limited to defining the bins relative to the high side of the borehole.

Measurement tool 120 and electronics 125 may be considered to be an apparatus or system that is part of a larger system. System 100 may include memory to store information on borehole properties or formation properties based on a weighted average of values of the borehole properties or formation properties, where the weight is correlated to ranges of azimuthal angles at which measurements are taken while drilling. The memory may be disposed in electronics 125, at another location in housing 110, at another housing on a drill string, or at a surface location remote from the drilling point.

Measurements to be made while drilling a well may include measurements of borehole and formation properties of the well. Borehole measurements relate to the borehole (also referred to as a wellbore) itself, including the openhole, which is the uncased portion of the well. Borehole may refer to the inside diameter of the wall of the wellbore. The wellbore wall is the rock face that bounds the drilled hole. Typically, formation refers to a body of rock that can be mapped. Such mapping may depend on the rock being continuous and sufficiently distinctive. Formation measurements relate to the rock around the borehole, typically including the volume of rock and the physical properties of this volume. A geological model may be employed to provide properties of the rock beyond the measurement.

Measurement of the properties of the well in the vicinity of the drilling point may be performed with various techniques. Conventional wireline tools allow measurement of one or more physical quantities in or around a well as a function of depth or time, where the logging or recording of data is taken down in the well with the log being transmitted back to the surface through a wireline and recorded at the surface. Wireline tools typically use single-strand or multi-strand wire or electrical cable to lower tools into the borehole to transmit data and are not used while drilling. Measurement-while-drilling (MWD) tools allow information to be transmitted to the surface or recorded while drilling down in the hole. MWD tools provide for evaluation of physical properties, typically borehole properties that generally include pressure, temperature, and borehole trajectory in three-dimensional space. Transmission techniques associated with MWD tools to send the information to the surface may use mud pulses, which are pressure pulses in a mud system. Mud typically relates to drilling fluid, which may include most fluids used in oil and gas drilling operations, where the fluids may contain significant amounts of suspended solids, emulsified water, or oil. Measurement of various properties in the well as a function of depth or time while drilling may also be performed using logging-while-drilling (LWD) tools.

LWD tools are measurement-while-drilling tools that also measure formation parameters such as resistivity, porosity, sonic velocity, and gamma ray. LWD tools may include devices and systems integrated into a bottomhole assembly that provide for the measurement of formation properties during hole excavation, or shortly thereafter. Use of LWD tools allows for the measurement of the properties before drilling fluids invade deeply into the well. LWD tools allow for measurements that may be difficult to attain with conventional wireline tools.

In a logging while drilling procedure, the drilling collar used may have a diameter as close to the diameter of the drilling hole size so as to minimize the gap between a drilling collar and the hole wall. In various embodiments, the gap may be used to provide a weighting factor to generate a value for the borehole property or the formation property at a particular depth based on measurements taken as a function of an angle of rotation from some reference.

In an embodiment, borehole properties or formation properties that have been computed for a set of azimuthal bins are combined to obtain the best value representative of the borehole or the formation as a whole. An azimuthal bin provides a range of angles relative to a reference point. Such a measurement process may be realized using LWD nuclear tools. The method may be applied to LWD nuclear tools that have an azimuthally asymmetric response. Nuclear tools generally have one or two sensors that measure the number of nuclear particles measured per second (count rate). The sensors are typically positioned off center in a drill collar, so that there is a front side and back side to the tool. The nuclear tools may also have a nuclear source incorporated into the device. In some cases, collimators facilitate the passage of nuclear particles into and out of the tool from the front. In an embodiment, some type of standoff measurement may be made within each azimuthal bin. In an embodiment, ultrasonic standoff measurements may be performed to generate standoffs for each azimuthal bin.

As a LWD tool rotates, measured count rates are divided into azimuthal bins, which correspond to a preset range in angles relative to the measurement tool. The count rates may be correlated to the type of measurement used in a particular application such as a gamma-gamma density tool, a neutron-porosity tool, or some other type of tool to provide measurements while drilling. In addition, an average standoff as seen by the nuclear sensors of the measurement tool when they are in an azimuth range is recorded for each azimuth bin. The azimuth bins may be assigned by dividing a 360° rotation into a set of azimuth angular ranges, whose sum is 360°. The division into bins may be a division into equal ranges. Alternatively, depending on the application, the division into bins may be a division into unequal ranges. In an embodiment, the 360° rotation may be divided into sixteen bins, each of which spans 22.5 degrees. A desired formation property may be computed for each bin. Such formation properties include, but are not limited to, density, Pe, and neutron porosity.

Determination of one number that is representative of a formation property may be performed. Since nuclear measurements degrade as the standoff increases, data corresponding to small standoffs may have the greatest bearing on the final number. One approach may include assigning the formation property from the bin with the smallest standoff as the one number to represent the formation property. However, this approach may limit the statistical precision of the one number. Another approach includes averaging the results for the formation property from each bin, which may provide more precision than the first approach, because this second approach uses all the formation information derived from the measurements. However, it may be less accurate than the first approach, since it would incorporate data from azimuths at which there was significant standoff that degrades the measurement. In an embodiment, an approach may be taken that combines results from the bins in a manner that enhances both accuracy and precision by taking a weighted average of the formation results. Standoffs may be used to generate the weights. Such an approach may also be used for generating one number that is representative of a formation property or a borehole property. A single value for a borehole property or a formation property may be determined as a function of drilling depth from the surface.

The application of a parameter as a weight may depend on the type of measurement tool used in an application. For instance, a density tool may be configured to use a standoff as a weight for an azimuthal bin. In the case of a density tool, the measurement degrades rapidly with standoff. A weighting factor using a standoff may be reduced to a common value for standoffs greater than one inch. Consequently, a weighting function that decreases as the standoff increases may be used. In an embodiment, a weighting function may be applied in which the weighting function decreases by a factor of sixteen for each quarter inch of standoff out to a standoff of one inch. Such a weighting factor may be represented by the function $$w(s)=65000e^{-11.08s} \text{ for } s<1$$

$$w(s)=1 \text{ for } s \geq 1, \quad (1)$$

where s is the standoff in inches. Other weighting functions may be used.

Since neutron measurements are not as sensitive to standoff as density measurements, the weighting factor may not drop as rapidly with standoff. In an embodiment, the weighting function for a neutron measurement may provide for decreasing by a factor of four for each quarter inch out to a standoff of two inches. Such a weighting factor may be represented by the function $$w(s)=65000e^{-5.541s} \text{ for } s<2$$

$$w(s)=1 \text{ for } s \geq 2, \quad (2)$$

where s is the standoff in inches. Other weighting functions may be used.

Figure 2:
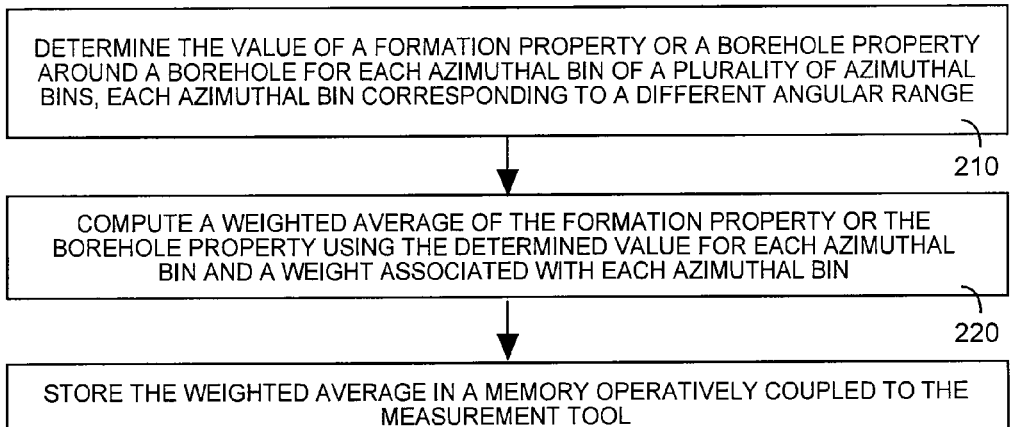
FIG. 2 illustrates features of an embodiment of a method to provide a number representative of a borehole property or a formation property.

FIG. 2 illustrates features of an embodiment of a method to provide a number representative of a borehole property or a formation property. At 210, a value of a formation property or a borehole property around a borehole is determined for each azimuthal bin of a plurality of azimuthal bins. Each azimuthal bin corresponds to a different angular range relative to a reference location. The plurality of azimuthal bins may be categorized as a number of bins, where the sum of the ranges for each bin is 360 angular degrees. In an embodiment, the set of azimuthal bins is arranged as sixteen azimuthal bins such that the sum of azimuthal angles correlated to each azimuthal bin equals 360 angular degrees. In various embodiments, the number of bins may be set at any number depending on the application. The measurements for determining a value of the formation property or the borehole property may be collected from the measurement tool while drilling. Each collected measurement may be assigned to the associated azimuthal bin of the plurality of azimuthal bins. In an embodiment, data collected during measurement is stored into the bins corresponding to the azimuthal angle range in which the measurement is made. The data may be sampled every 10 milliseconds and stored in the appropriate azimuthal bins. At the end of a longer time period, for example, 10 seconds, the data in each of the angular bins may be averaged. The average of the count rates may be converted to a borehole property or a formation property, depending on the measurements conducted.

Algorithms stored in electronics situated on a drilling collar with the measurement tool may be used to convert the measurements to the values of the formation property or the borehole property. The measurement tool may be a logging-while-drilling measurement tool. When collecting measurements from a logging-while-drilling measurement tool, the measured count rates of the logging-while-drilling measurement tool may be divided into the azimuthal bins as the logging-while-drilling measurement tool rotates.

At 220, a weighted average of the formation property or the borehole property may be computed using the determined value for each azimuthal bin and a weight associated with each azimuthal bin. A standoff may be applied to generate the weights. For each azimuthal bin, an average standoff may be applied to generate the weight for the azimuthal bin, where the average standoff is derived as an average of a plurality of standoffs for the azimuthal bin. Standoff measurements do not have to be combined with count rate data in small time increments, such as a range of milliseconds, during data acquisition. The computed weighted average of the formation property or the borehole property may use a standoff or an averaged standoff for each azimuthal bin for a density tool using the weighting function of equation (1). The computed weighted average of the formation property or the borehole property may use a standoff or an averaged standoff for each azimuthal bin for a neutron measurement tool using the weighting function of equation (2). Other weighting functions may be used. The value of the formation property or the borehole property for each azimuthal bin may be averaged over a ten second period of time. In an embodiment, a weighted average of the count rates from a measurement tool is converted to generate a single value for a borehole property or a formation property. A single value for a borehole property or a formation property may be determined as a function of drilling depth from the surface.

At 230, the weighted average of the borehole property or the formation property may be stored in a memory operatively coupled to the measurement tool. The memory may be co-located with the measurement tool. The memory may be located on the same drill string on a drill collar different from the drilling collar on which the measurement tool is located. The memory may be located at the surface above the well in which measurements are made.

Listed in the table below is an example of relative weights using equation (1), where a rotating density tool experiences standoffs that range from 0.1 to 0.5 inches. Weights generated from equation (1) are also listed.

TABLE

Relative weights for a density tool example.

| Bin No. | Standoff (in.) | Weight | Relative Weight |
|---|---|---|---|
| 1 | 0.1 | 21,464 | 25.0% |
| 2 | 0.14 | 13,780 | 16.0% |
| 3 | 0.18 | 8,846 | 10.3% |
| 4 | 0.24 | 4,550 | 5.3% |
| 5 | 0.3 | 2,341 | 2.7% |
| 6 | 0.35 | 1,345 | 1.6% |
| 7 | 0.4 | 773 | 0.9% |
| 8 | 0.45 | 444 | 0.5% |
| 9 | 0.5 | 255 | 0.3% |
| 10 | 0.45 | 444 | 0.5% |
| 11 | 0.4 | 773 | 0.9% |
| 12 | 0.35 | 1,345 | 1.6% |
| 13 | 0.3 | 2,341 | 2.7% |
| 14 | 0.24 | 4,550 | 5.3% |
| 15 | 0.18 | 8,846 | 10.3% |
| 16 | 0.14 | 13,780 | 16.0% |

Dividing each weight by the sum of all the weights yields the relative weight for each window. In this example, the major contributions come from five different bins: 1, 2, 3, 15, and 16. Assuming that the statistical uncertainty is the same for each bin, the uncertainty of the weighted average is 38% that of an individual bin. Thus, the weighted average has a statistical precision that is 2.4 times better than if the bin with the smallest standoff were used alone.

Various embodiments of the technique described herein determine a value of a property by applying a weighted average to properties computed in different azimuthal bins, where the technique provides a value that has enhanced precision and accuracy over other techniques. The weighting may be generated by applying a standoff measured for each azimuthal bin. Such techniques are related to the proposition that smaller standoffs correspond to better measurements. Unlike techniques applied to count rates measured in small time increments, irrespective of azimuth, various embodiment are applied in which standoff measurements do not have to be combined with count rate data in small time increments during data acquisition. A procedure based on combining standoff measurements with count rate data in small time increments, such as approximately 5-20 msec, may not be possible with all hardware.

Embodiments similar to those described herein may be realized without determining the best manner of combining the bins based on the measurements themselves, which may use significant processing time and power. Techniques that determine the best manner of combining the bins based on the measurements themselves may not always provide the desired value. For example, a method of combining bins based on estimates of the quality of the measurement obtained from the measured count rates may assume that quality information is contained in the count-rate measurements and that the quality information can be readily extracted. However, such an assumption may not generally be appropriate, such as in the application of neutron data. Also, there are situations in heavy mud where traditional density algorithms provide diagnostic curves that incorrectly identify the quality as good. The technique in the various embodiments herein may apply a standoff measurement, which is a more direct means of determining quality than conventional methods.

Conventional methods may include selecting a subset of the data collected in small time increments relative to the time of rotation (e.g. 10 msec). The selected subset consists of the lowest or highest count rates, depending on which is deemed to correspond to the smallest standoff. Selection is based on a statistical analysis of the measured count rates over an interval of seconds (e.g. 10). That subset is assumed to provide the best estimate of formation properties. Such technique may not be generally applicable to neutron tools, because of the low count rate associated with the neutron tool. Also, this technique may not work with density tools in high-angle wells near a bed boundary, where, in such cases, the analyzing algorithms may be biased towards measurements obtained when oriented towards the higher-density formation instead of those obtained with the lowest standoff.

Various embodiments to provide a number representative of a borehole property or a formation property using weighted averages generated from standoffs may improve neutron logs and may provide a better density log, particularly near bed boundaries.

Various embodiments of measurement tools and electronics to provide a value for a borehole property or a formation property may include any form of machine-readable medium that has executable instructions to determine a value of a formation property or a borehole property around a borehole for each azimuthal bin of a plurality of azimuthal bins, where each azimuthal bin corresponds to a different angular range, to compute a weighted average of the formation property or the borehole property using the determined value for each azimuthal bin and a weight associated with each azimuthal bin, and to store the weighted average in a memory operatively coupled to a controller of the measurement tool. The angles may be referenced to a location on a side of the borehole. Azimuth may be determined by magnetometers, which continually measure the tool's angle relative to the earth's magnetic field. Periodically, (when the tool is not drilling) the tool's orientation in the borehole may be measured relative to the gravitational field using accelerometers. This is used to calibrate the offset between north and the high side of the borehole. Thus: the bins may be defined relative to the high side of the borehole. Structuring the bins is not limited to defining the bins relative to the high side of the borehole. The machine-readable medium may include instructions to collect measurements from the measurement tool while drilling and to assign each collected measurement to an associated azimuthal bin of the plurality of azimuthal bins. The machine-readable medium may include instructions to determine a value of a formation property or a borehole property around a borehole for each azimuthal bin by forming an average value of the formation property or the borehole property for each azimuthal bin.

The machine-readable medium may include instructions to apply a plurality of standoffs to generate the weights, where each standoff is correlated to an azimuthal bin. The machine-readable medium may include instructions to compute a weighted average of a density using equation (1). The machine-readable medium may include instructions to compute a weighted average of a neutron porosity using equation (2). The machine-readable medium may include instructions to operate a measurement tool other than a density tool or a neutron porosity tool to compute a weighted average of a borehole property or a formation property.

In an embodiment, a weighted average of the count rates from a measurement tool is converted to generate a single value for a borehole property or a formation property. The machine-readable medium may include instructions to make measurements while drilling. The machine-readable medium is not limited to any one type of medium. The machine-readable medium used may depend on the application using an embodiment of measurement tools and electronics to provide a single value for a borehole property or a formation property. A single value for a borehole property or a formation property may be determined as a function of drilling depth from the surface. The machine-readable medium may be realized as a computer-readable medium.

Figure 3:
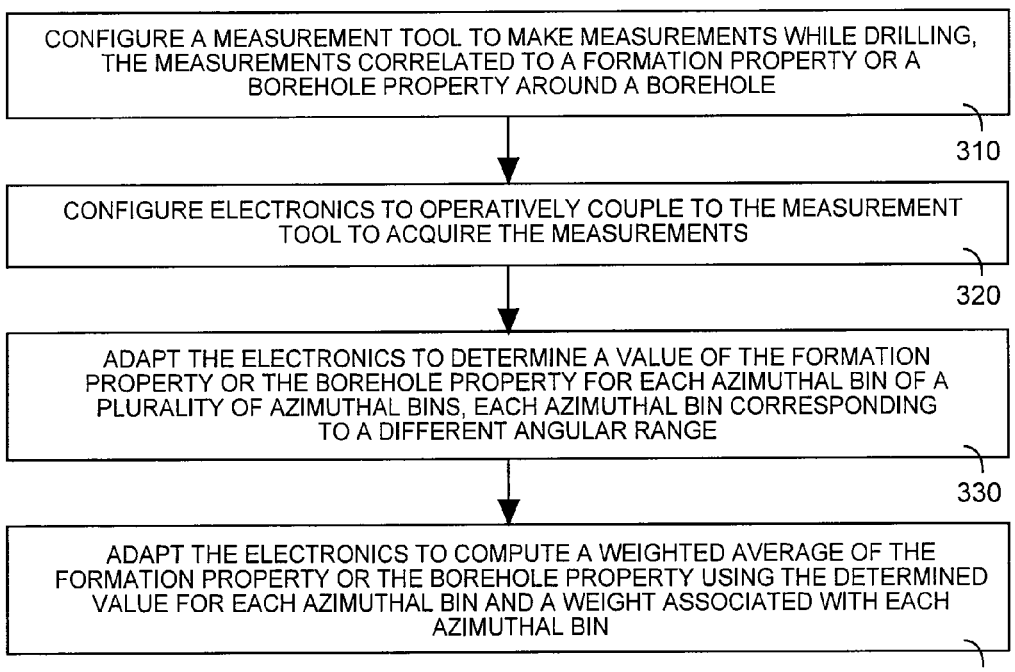
FIG. 3 illustrates features of an embodiment of a method for constructing a system that includes components to provide a number representative of a borehole property or a formation property.

FIG. 3 illustrates features of an embodiment of a method for constructing a system that includes components to provide a number representative of a borehole property or a formation property. At 310, a measurement tool is configured to make measurements while drilling, where the measurements are correlated to a formation property or a borehole property around a borehole. At 320, electronics are configured to operatively couple to the measurement tool to acquire the measurements. At 330, the electronics are adapted to determine a value of the formation property or the borehole property for each azimuthal bin of a plurality of azimuthal bins, where each azimuthal bin corresponds to a different angular range relative to a reference location. At 340, the electronics may be adapted to compute a weighted average of the formation property or the borehole property using the determined value for each azimuthal bin and a weight associated with each azimuthal bin. The electronics may be adapted to compute a weighted average of count rates using weights associated with each azimuthal bin, where the count rates are stored in the corresponding azimuthal bins from measurements, and to convert the weighted average of count rates to the formation property or the borehole property. The electronics may be adapted to provide the weighted average before being arranged with the measurement tool. The measurement tool may be a logging-while-drilling measurement tool. A standoff measurement tool may be configured to operate with the electronics to provide a measurement a standoff for each azimuthal bin. The standoff for each azimuthal bin may be realized as an average standoff for the azimuthal bin. The electronics may be adapted to apply a plurality of standoffs to generate the weights, where each standoff is correlated to an azimuthal bin.

Figure 4:
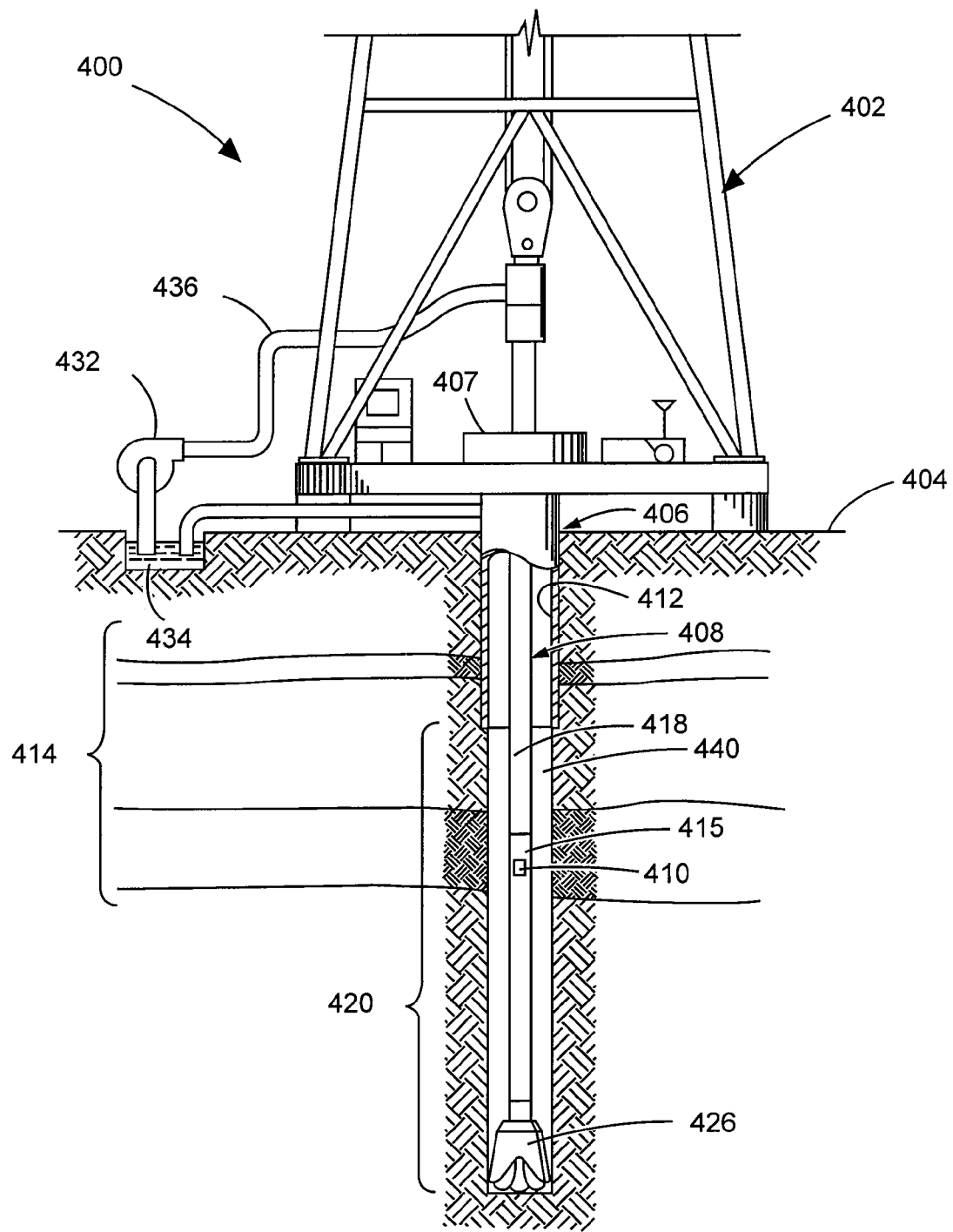
FIG. 4 depicts an embodiment of a system at a drilling site, where the system includes components to provide a number representative of a borehole property or a formation property.

FIG. 4 depicts an embodiment of a system 400 at a drilling site, where system 400 includes a measurement tool and electronics to determine a value of a property by applying a weighted average to properties computed in different azimuthal bins. Properties for which a single value may be determined may include a formation property and/or a borehole property. System 400 may include a drilling rig 402 located at a surface 404 of a well 406 and a string of drill pipes, that is drill string 408, connected together so as to form a drilling string that is lowered through a rotary table 407 into a wellbore or borehole 412. The drilling rig 402 may provide support for drill string 408. The drill string 408 may operate to penetrate rotary table 407 for drilling a borehole 412 through subsurface formations 414. The drill string 408 may include drill pipe 418 and a bottom hole assembly 420 located at the lower portion of the drill pipe 418.

The bottom hole assembly 420 may include drill collar 415, housing 410, and a drill bit 426. Housing 410 is not limited to an upper portion of drill collar 415, but may be situated at any location along drill collar 415. The drill bit 426 may operate to create a borehole 412 by penetrating the surface 404 and subsurface formations 414. Housing 410 may include sensors to make measurements while drilling. In various embodiments, housing 410 may include an embodiment of a measurement tool and related electronics to determine a value of a property by applying a weighted average to properties computed in different azimuthal bins.

During drilling operations, the drill string 408 may be rotated by the rotary table 407. In addition to, or alternatively, the bottom hole assembly 420 may also be rotated by a motor (e.g., a mud motor) that is located downhole. The drill collars 415 may be used to add weight to the drill bit 426. The drill collars 415 also may stiffen the bottom hole assembly 420 to allow the bottom hole assembly 420 to transfer the added weight to the drill bit 426, and in turn, assist the drill bit 426 in penetrating the surface 404 and subsurface formations 414.

During drilling operations, a mud pump 432 may pump drilling fluid (sometimes known by those of skill in the art as "drilling mud") from a mud pit 434 through a hose 436 into the drill pipe 418 and down to the drill bit 426. The drilling fluid can flow out from the drill bit 426 and be returned to the surface 404 through an annular area 440 between the drill pipe 418 and the sides of the borehole 412. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation 414 cuttings created by operating the drill bit 426.

Various embodiments of the technique described herein determine a value of a property by applying a weighted average to properties computed in different azimuthal bins, where the technique provides a value that has enhanced precision and accuracy over other techniques. The weighting may be generated by applying a standoff measured for each azimuthal bin. Embodiments to provide a number representative of a borehole property or a formation property using weighted averages generated from standoffs may improve neutron logs and may provide a better density log, particularly near bed boundaries.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    making measurements in a borehole using a measurement tool for each azimuthal bin of a plurality of azimuthal bins, each azimuthal bin corresponding to a different angular range around the borehole relative to a reference location;
    measuring a standoff for each of the azimuthal bins;
    determining a value of at least one of a formation property or a borehole property around a borehole for each azimuthal bin from the measurements;
    electronically computing a weighted average of the at least one of the formation property or the borehole property using the determined value for each azimuthal bin and a weight associated with each azimuthal bin, the weight associated with each azimuthal bin being derived from the measured standoff for each of the azimuthal bins; and
    storing the weighted average in a memory operatively coupled to the measurement tool.

2. The method of claim 1, wherein
    measuring the standoff includes performing ultrasonic standoff measurements to generate the standoffs.

3. The method of claim 1, wherein the method includes using a plurality of standoffs in each azimuthal bin to generate the weight for each respective azimuthal bin.

4. The method of claim 1, wherein the method includes categorizing the plurality of azimuthal bins as sixteen azimuthal bins such that the sum of azimuthal angles correlated to each azimuthal bin equals 360 angular degrees.

5. The method of claim 1, wherein making measurements includes making measurements with a logging-while-drilling measurement tool.

6. The method of claim 5, wherein making measurements with the logging-while-drilling measurement tool includes dividing measured count rates of the logging-while-drilling measurement tool into the azimuthal bins as the logging-while-drilling measurement tool rotates.

7. The method of claim 1, wherein the method includes
    measuring a plurality of standoffs for at least one azimuthal bin of the plurality of azimuthal bins;
    electronically generating an average standoff for the at least one azimuthal bin; and
    applying the average standoff as the measured standoff to derive the weight the at least one azimuthal bin.

8. The method of claim 7, wherein the method includes, for each azimuthal bin, applying an average standoff to generate the weight for the azimuthal bin, the average standoff being the average of a plurality of standoffs for the azimuthal bin.

9. The method of claim 1, wherein determining the value of at least one of a formation property or a borehole property includes determining a density.

10. The method of claim 9, wherein computing the weighted average of the density includes using a weighting function for each azimuthal bin represented by $w(s) = 65000 e^{-11.08 s}$ for $s < 1$ and $w(s) = 1$ for $s \geq 1$, with $s$ being the standoff in inches.

11. The method of claim 1, wherein determining the value of at least one of a formation property or a borehole property includes determining a neutron porosity.

12. The method of claim 11, wherein computing the weighted average of the neutron porosity includes using a weighting function for each azimuthal bin represented by $w(s)=65000e^{-5.541s}$ for $s<2$ and $w(s)=1$ for $s\geq 2$, with s being the standoff in inches.

13. The method of claim 1, wherein determining the value of at least one of a formation property or a borehole property around the borehole for each azimuthal bin includes forming an average value of the at least one of the formation property or the borehole property for each azimuthal bin.

14. The method of claim 13, wherein forming the average value of the at least one of the formation property or the borehole property for each azimuthal bin includes forming the average value of the at least one of the formation property or the borehole property for each azimuthal bin over a ten second period of time.

15. A machine-readable device that stores instructions, which when performed by a machine, cause the machine to:
   make measurements in a borehole using a measurement tool for each azimuthal bin of a plurality of azimuthal bins, each azimuthal bin corresponding to a different angular range around the borehole relative to a reference location;
   measure a standoff for each of the azimuthal bins;
   determine a value of at least one of a formation property or a borehole property around a borehole for each azimuthal bin from the measurements;
   electronically compute a weighted average of the at least one of the formation property or the borehole property using the determined value for each azimuthal bin and a weight associated with each azimuthal bin, the weight associated with each azimuthal bin being derived from the measured standoff for each of the azimuthal bins; and
   store the weighted average in a memory operatively coupled to a controller of a measurement tool.

16. The machine-readable device of claim 15, wherein the instructions include instructions to:
   measure the standoff includes performing ultrasonic standoff measurements to generate the standoffs.

17. The machine-readable device of claim 15, wherein the instructions include instructions to apply a plurality of standoffs in each azimuthal bin to generate the weight for each respective azimuthal bin.

18. The machine-readable device of claim 15, wherein to compute the weighted average includes computing a weighted average of a density using a weighting function for each azimuthal bin represented by $w(s)=65000e^{-11.08s}$ for $s<1$ and $w(s)=1$ for $s\geq 1$, with s being the standoff in inches.

19. The machine-readable device of claim 15, wherein to compute the weighted average includes computing a weighted average of neutron porosity using a weighting function for each azimuthal bin represented by $w(s)=65000e^{-5.541s}$ for $s<2$ and $w(s)=1$ for $s\geq 2$, with s being the standoff in inches.

20. The machine-readable device of claim 15, wherein to determine the value of at least one of a formation property or a borehole property around a borehole for each azimuthal bin includes forming an average value of the at least one of the formation property or the borehole property for each azimuthal bin.

21. A system comprising:
   a measurement tool configured to make measurements in a borehole for each azimuthal bin of a plurality of azimuthal bins, each azimuthal bin corresponding to a different angular range around the borehole relative to a reference location, the measurements correlated to at least one of a formation property or a borehole property around a borehole;
   a standoff measurement tool to measure a standoff for each of the azimuthal bins; and
   electronics operatively coupled to the measurement tool to acquire the measurements, the electronics structured to:
      determine a value of the at least one of the formation property or the borehole property for each azimuthal bin around the borehole from the measurements; and
      electronically compute a weighted average of the at least one of the formation property or the borehole property using the determined value for each azimuthal bin and a weight associated with each azimuthal bin, the weight associated with each azimuthal bin being derived from the measured standoff for each of the azimuthal bins.

22. The system of claim 21, wherein the system includes memory to store the weighted average.

23. The system of claim 21, wherein the measurement tool includes a logging-while-drilling measurement tool.

24. The system of claim 21, wherein the standoff measurement tool is structured to perform ultrasonic standoff measurements to generate the standoffs.

25. The system of claim 21, wherein the electronics is structured to apply a plurality of standoffs in each azimuthal bin to generate the weight for, each respective azimuthal bin.

26. The system of claim 21, wherein the measurement tool includes a density measurement tool.

27. The system of claim 21, wherein the measurement tool includes a neutron porosity measurement tool.

28. The system of claim 21, wherein the electronics is structured to generate an average value of the at least one of the formation property or the borehole property for each azimuthal bin.

29. The system of claim 21, wherein the system includes a drill string with the measurement tool disposed near an end of the drill string, the end of the drill sting having a drilling tool.

30. The system of claim 21, wherein the system includes a data transmission system to send the measurements to a memory located at a surface location opposite a well bottom.

31. A method comprising:
   structuring a measurement tool to make measurements in a borehole for each azimuthal bin of a plurality of azimuthal bins, each azimuthal bin corresponding to a different angular range around the borehole relative to a reference location, the measurements correlated to at least one of a formation property or a borehole property around the borehole;
   structuring a standoff measurement tool to measure a standoff for each of the azimuthal bins; and
   structuring electronics to operatively couple to the measurement tool to acquire the measurements, the electronics structured to:
      determine a value of the at least one of the formation property or the borehole property for each azimuthal bin around the borehole from the measurements; and electronically compute a weighted average of the at least one of the formation property or the borehole property using the determined value for each azimuthal bin and a weight associated with each azimuthal bin, the weight associated with each azimuthal bin being derived from the measured standoff for each of the azimuthal bins.

32. The method of claim 31, wherein structuring the measurement tool includes forming a logging-while-drilling measurement tool.

33. The method of claim 31, wherein structuring the standoff measurement tool includes structuring the standoff measurement tool to perform ultrasonic standoff measurements to generate the standoffs.

34. The method of claim 31, wherein structuring the electronics includes structuring the electronics to apply a plurality of standoffs in each azimuthal bin to generate the weight for respective azimuthal bin.

* * * * *